United States Patent
Abe et al.

(10) Patent No.: US 10,572,170 B2
(45) Date of Patent: Feb. 25, 2020

(54) WRITING FILE INFORMATION FOR TAPE FILE SYSTEMS

(71) Applicant: International Business Machines Corporation, Armonk, NY (US)

(72) Inventors: Atsushi Abe, Ebina (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 15/369,684

(22) Filed: Dec. 5, 2016

(65) Prior Publication Data

US 2018/0157420 A1   Jun. 7, 2018

(51) Int. Cl.
*G06F 3/06* (2006.01)

(52) U.S. Cl.
CPC ............ *G06F 3/064* (2013.01); *G06F 3/0604* (2013.01); *G06F 3/0644* (2013.01); *G06F 3/0682* (2013.01)

(58) Field of Classification Search
CPC ...... G06F 3/064; G06F 3/0604; G06F 3/0644; G06F 3/0682; G06F 3/0686
See application file for complete search history.

(56) References Cited

U.S. PATENT DOCUMENTS

| | | | | |
|---|---|---|---|---|
| 4,193,021 A * | 3/1980 | Gale | ................ | G05B 19/4205 318/568.1 |
| 5,504,873 A * | 4/1996 | Martin | ................ | G06F 3/0607 369/30.32 |
| 5,850,328 A * | 12/1998 | Leonhardt | .......... | G11B 5/00813 360/134 |
| 6,816,941 B1 * | 11/2004 | Carlson | ................ | G06F 3/0607 711/111 |
| 9,323,776 B2 | 4/2016 | Sims et al. | | |
| 2004/0133737 A1 * | 7/2004 | Jaquette | ................ | G06F 3/0613 711/111 |

(Continued)

FOREIGN PATENT DOCUMENTS

WO   WO-2015087584 A1 *  6/2015  ............. G06F 12/00

OTHER PUBLICATIONS

Michael Richmond. "Filesystem recovery examples with ltfsck." Jul. 2011. http://www.smallersystems.com/blog/2011/07/filesystem-recovery-examples-with-ltfsck/. (Year: 2011).*

(Continued)

*Primary Examiner* — Nathan Sadler
(74) *Attorney, Agent, or Firm* — Zilka-Kotab, P.C.

(57) ABSTRACT

A computer-implemented method, according to one embodiment, includes: receiving a first portion of data to be written in a magnetic medium, dividing the first portion of data into a plurality of blocks, appending an identification segment having identification information therein to each of the blocks, wherein each block and the corresponding identification information appended thereto forms a record, writing each record in a data partition of the magnetic medium, and writing an index in the data partition of the magnetic medium in response to a predetermined condition being met, wherein the index is associated with all data on the magnetic medium. Other systems, methods, and computer program products are described in additional embodiments.

17 Claims, 15 Drawing Sheets

(56) References Cited

U.S. PATENT DOCUMENTS

| | | | |
|---|---|---|---|
| 2005/0191040 A1* | 9/2005 | Takagi | G11B 20/1202 386/263 |
| 2006/0075281 A1* | 4/2006 | Kimmel | G06F 11/1076 714/5.1 |
| 2011/0238716 A1 | 9/2011 | Amir et al. | |
| 2014/0337571 A1* | 11/2014 | Sims | G06F 3/0686 711/111 |
| 2015/0046645 A1 | 2/2015 | Iwanaga et al. | |
| 2015/0324128 A1 | 11/2015 | Abe et al. | |
| 2016/0077757 A1 | 3/2016 | Hasegawa et al. | |
| 2016/0313933 A1* | 10/2016 | Miyamura | G06F 12/00 |
| 2018/0129667 A1* | 5/2018 | Abe | G06F 3/0611 |

OTHER PUBLICATIONS

Brian Biskeborn. "ltfs_internal.c." Jan. 2015. https://oss.oracle.com/projects/ltfs/dist/files/source/OELS_LTFS_1.2.6_source/ltfs_126_20140709_orcl_oels_6_5.tar.gz. (Year: 2015).*

Mduerig. "Structure of TAR files." Aug. 2015. https://github.com/apache/jackrabbit-oak/blob/4049ea9a499d590f6a07662bd25be56e92550744/oak-doc/src/site/markdown/nodestore/segment/tar.md. (Year: 2015).*

Oracle. "Project Downloads: LTFS." Retrieved May 2019. https://oss.oracle.com/projects/ltfs/files/source/OELS_LTFS_1.2.6_source/. (Year: 2019).*

Shawn O. Brume Sc.D, "Optimizing LTFS Usage," IBM, Jul. 12, 2016, pp. 1-11.

* cited by examiner

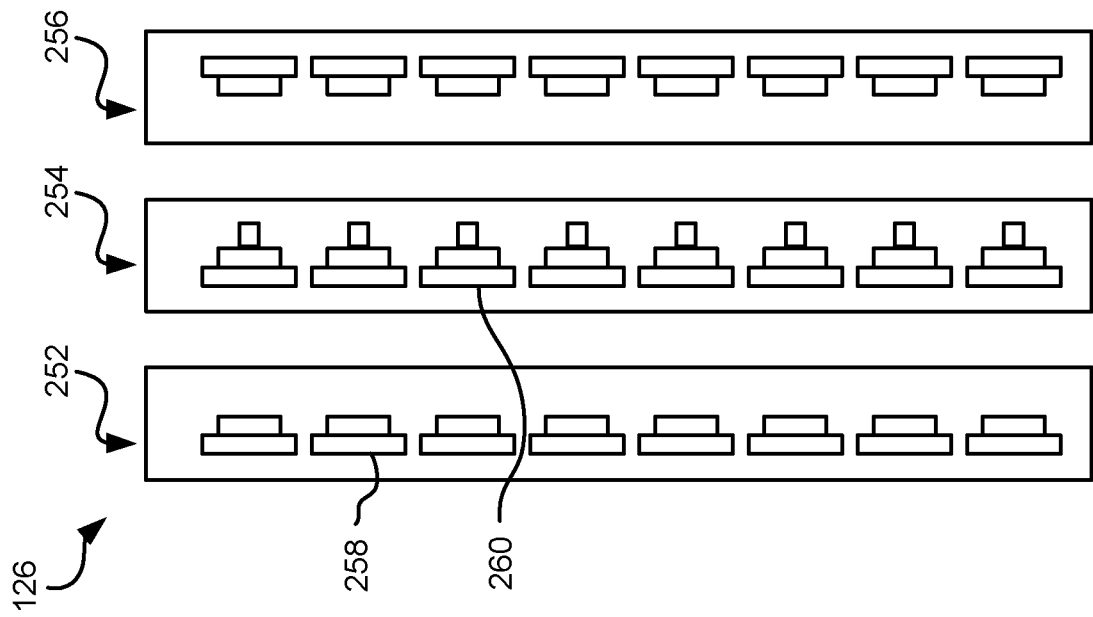
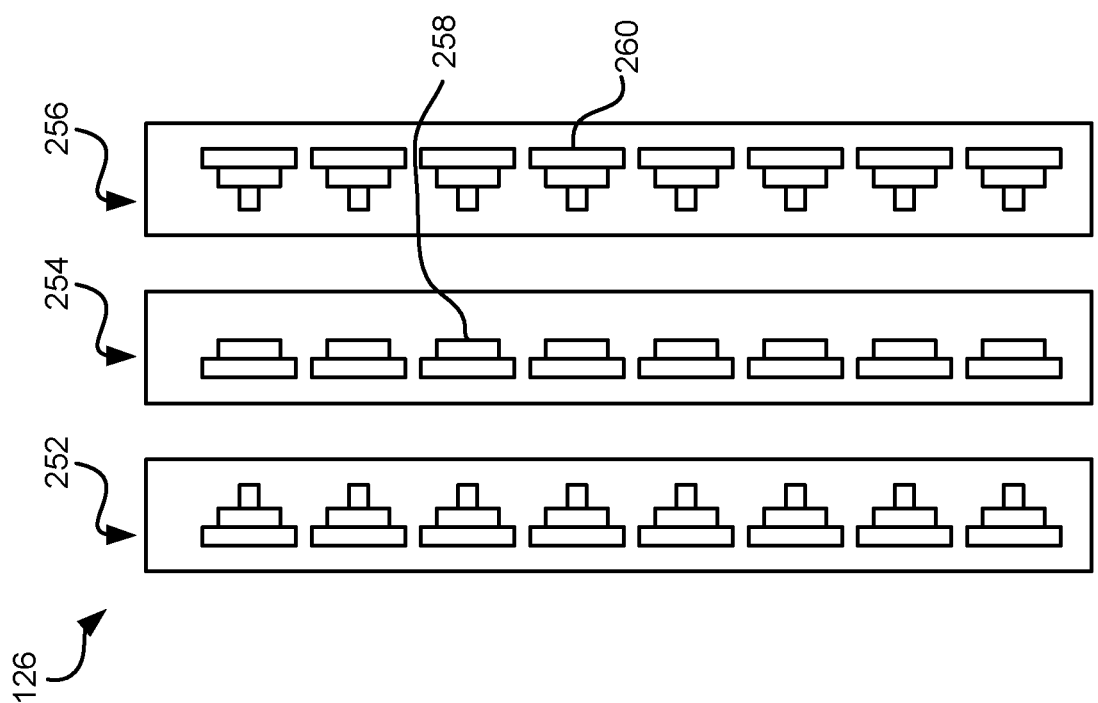

```
<file>
  <fileuid>6</fileuid>
  <name>binary_file2.bin</name>
  <length>825008</length>
  <readonly>false</readonly>
  <creationtime>2010-02-16T19:13:46.5123507 73Z</creationtime>
  <changetime>2010-02-16T19:13:46.5135102 63Z</changetime>
  <modiftime>2010-02-16T19:13:46.5135102 63Z</modiftime>
  <accesstime>2010-02-16T19:13:46.0000000 00Z</accesstime>
  <backuptime>2010-02-16T19:13:46.5123507 73Z</backuptime>
  <extentinfo>
    <extent>
      <partition>b</partition>
      <startblock>8</startblock>           1502
      <byteoffset>0</byteoffset>           1504
      <bytecount>825008</bytecount>        1506
      <fileoffset>0</fileoffset>
    </extent>
  </extentinfo>
```

WRITING FILE INFORMATION FOR TAPE FILE SYSTEMS

BACKGROUND

The present invention relates to data storage systems, and more particularly, this invention relates to reducing the amount of time associated with accessing data from tape.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

Moreover, as storage capacity increases, the ability to provide protection against data loss becomes more difficult. For instance, the amount of memory consumed in order to prevent loss of data stored in the memory rises as storage capacity increases. Moreover, the amount of data that could be lost as a result of failure to implement data protection at all is typically unacceptable.

SUMMARY

A computer-implemented method, according to one embodiment, includes: receiving a first portion of data to be written in a magnetic medium, dividing the first portion of data into a plurality of blocks, appending an identification segment having identification information therein to each of the blocks, wherein each block and the corresponding identification information appended thereto forms a record, writing each record in a data partition of the magnetic medium, and writing an index in the data partition of the magnetic medium in response to a predetermined condition being met, wherein the index is associated with all data on the magnetic medium.

A computer-implemented method, according to another embodiment, includes: reading an index that was most recently written in a data partition of a magnetic medium, determining whether a record was written in the data partition after the most recently written index, reading identification information included in a record in response to determining that the record was written in the data partition after the most recently written index, updating index information in the index based on the identification information read, and writing the updated index to the magnetic medium.

A computer program product, according to yet another embodiment, includes a computer readable storage medium having program instructions embodied therewith, the program instructions executable by a processor to cause the processor to: read, by the processor, an index that was most recently written in a data partition of a magnetic tape; determine, by the processor, whether a record was written in the data partition after the most recently written index; read, by the processor, identification information included in a record in response to determining that the record was written in the data partition after the most recently written index; update, by the processor, index information in the index based on the identification information read; and write, by the processor, the updated index to the tape.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 15 is program code of a method according to one embodiment.

DETAILED DESCRIPTION

Figure 1A:
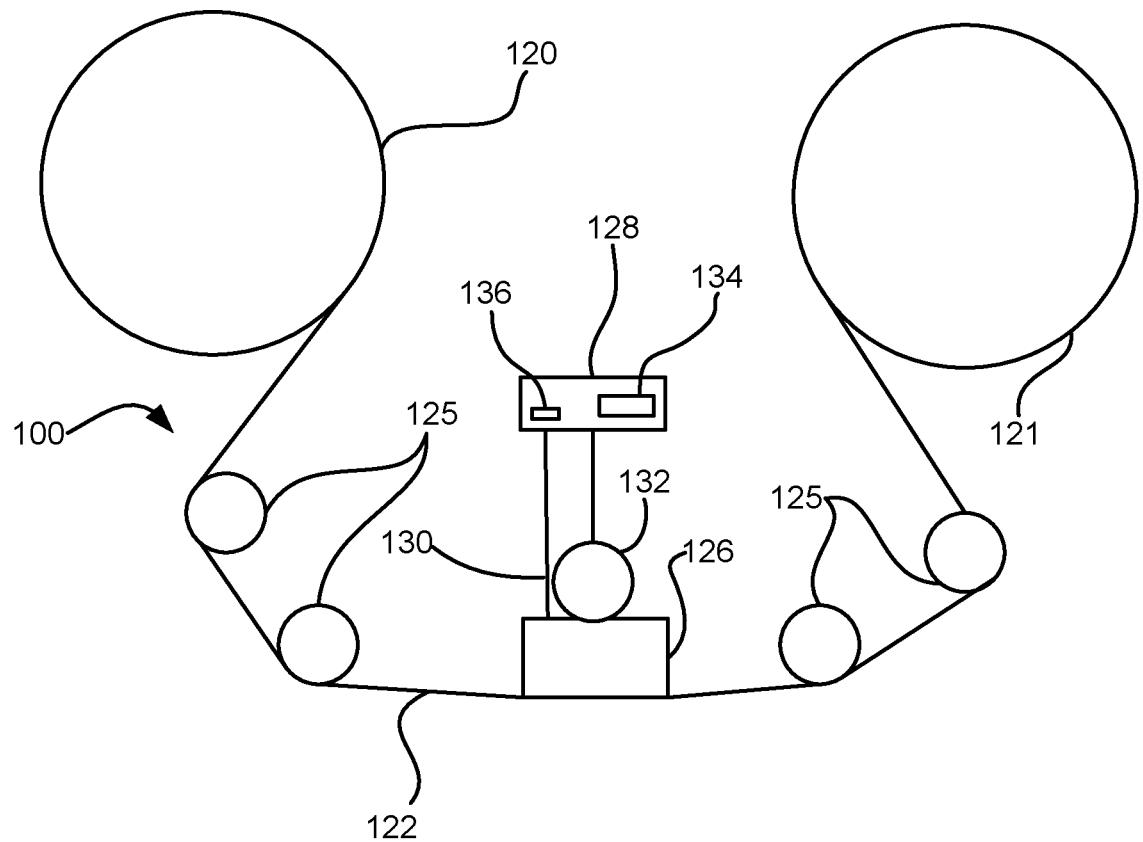
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems having improved data recording processes, as well as operation and/or component parts thereof. By implementing improved processes of recording data on magnetic media as described herein, the relation between records and paths of files may be preserved, even at the time of a sudden power outage. Moreover, this functionality may further be achieved without consuming a large amount of the capacity of the magnetic medium.

In one general embodiment, a computer-implemented method includes: receiving a first portion of data to be written in a magnetic medium, dividing the first portion of data into a plurality of blocks, appending an identification segment having identification information therein to each of the blocks, wherein each block and the corresponding identification information appended thereto forms a record, writing each record in a data partition of the magnetic medium, and writing an index in the data partition of the magnetic medium in response to a predetermined condition being met, wherein the index is associated with all data on the magnetic medium.

In another general embodiment, a computer-implemented method includes: reading an index that was most recently written in a data partition of a magnetic medium, determining whether a record was written in the data partition after the most recently written index, reading identification information included in a record in response to determining that the record was written in the data partition after the most recently written index, updating index information in the index based on the identification information read, and writing the updated index to the magnetic medium.

In yet another general embodiment, a computer program product includes a computer readable storage medium having program instructions embodied therewith, the program instructions executable by a processor to cause the processor to: read, by the processor, an index that was most recently written in a data partition of a magnetic tape; determine, by the processor, whether a record was written in the data partition after the most recently written index; read, by the processor, identification information included in a record in response to determining that the record was written in the data partition after the most recently written index; update, by the processor, index information in the index based on the identification information read; and write, by the processor, the updated index to the tape.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
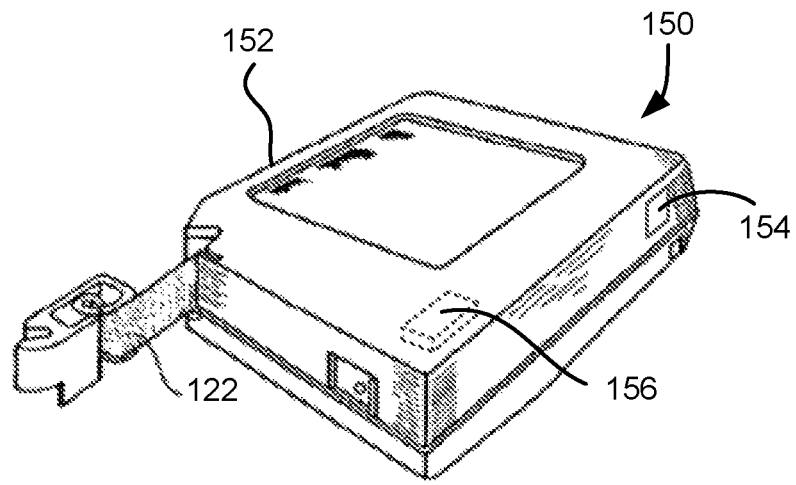
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or another device.

Figure 2A:
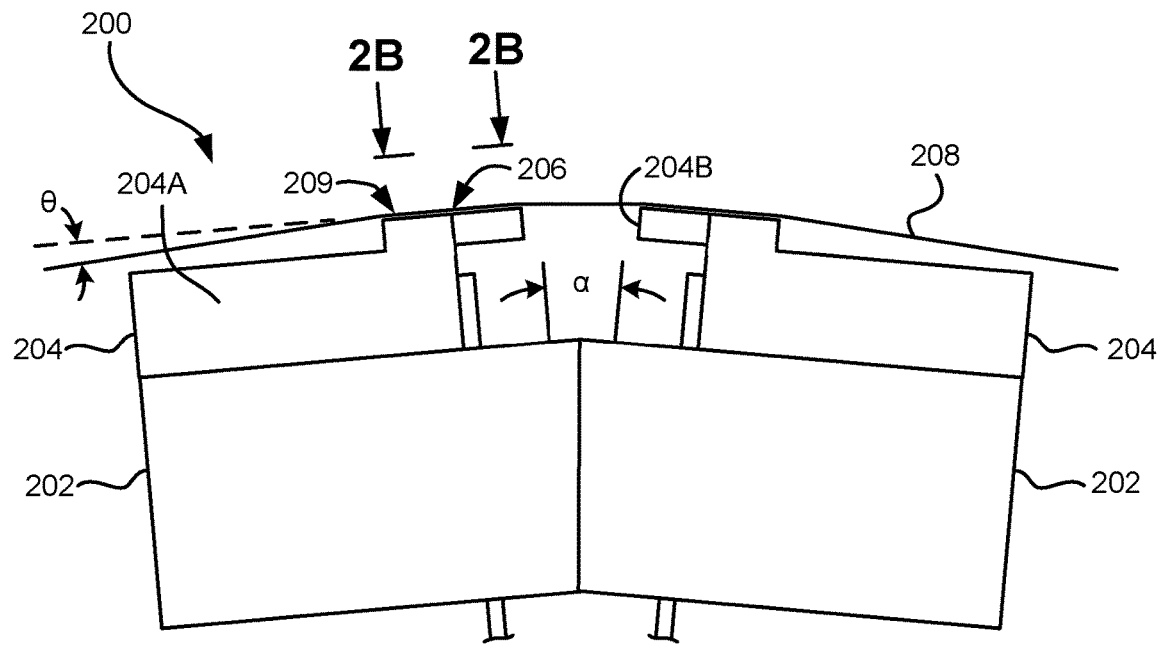
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
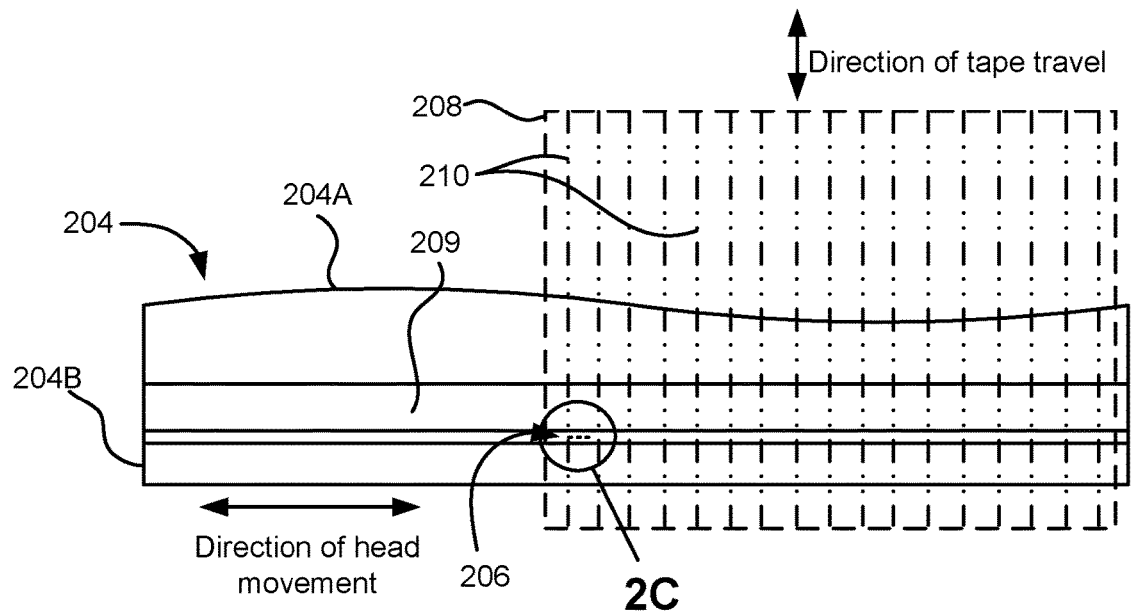
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
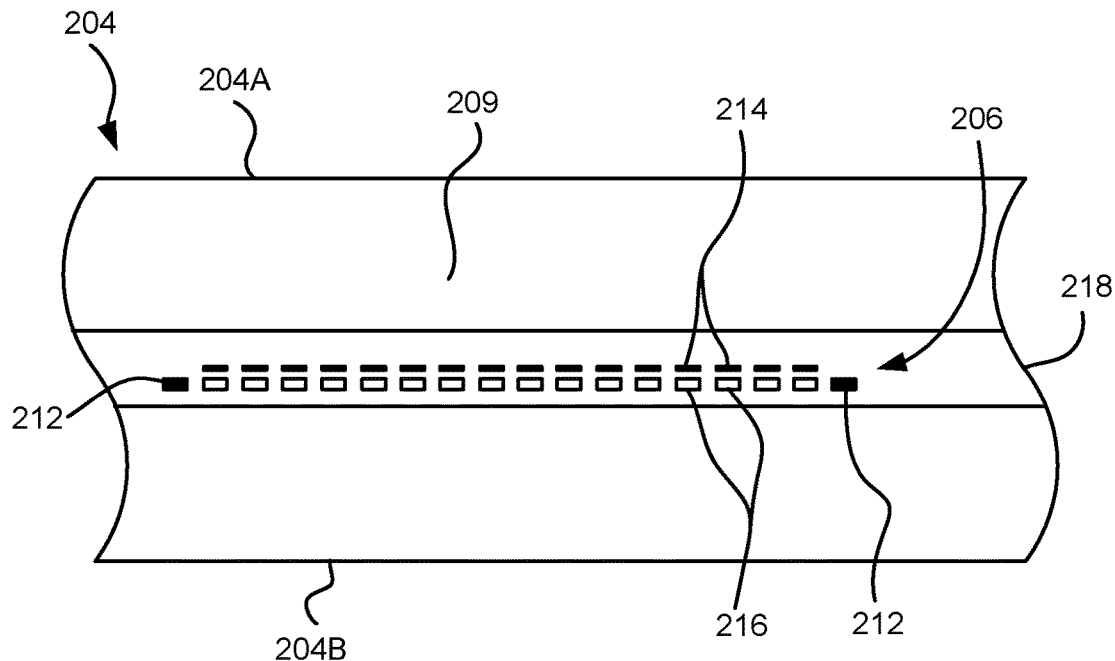
FIG. 2C is a detailed view taken from Circle 2C of FIG. 2B.

FIG. 2C depicts a plurality of readers and/or writers 206 formed in a gap 218 on the module 204 in Line 2B of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
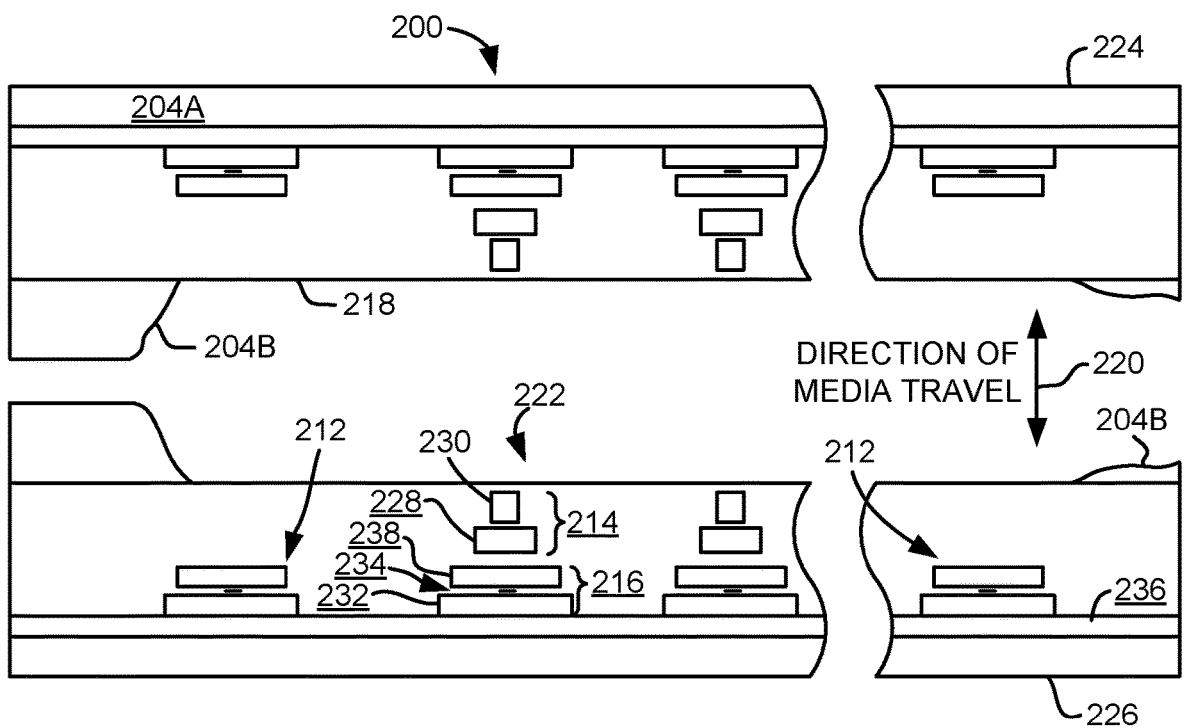
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
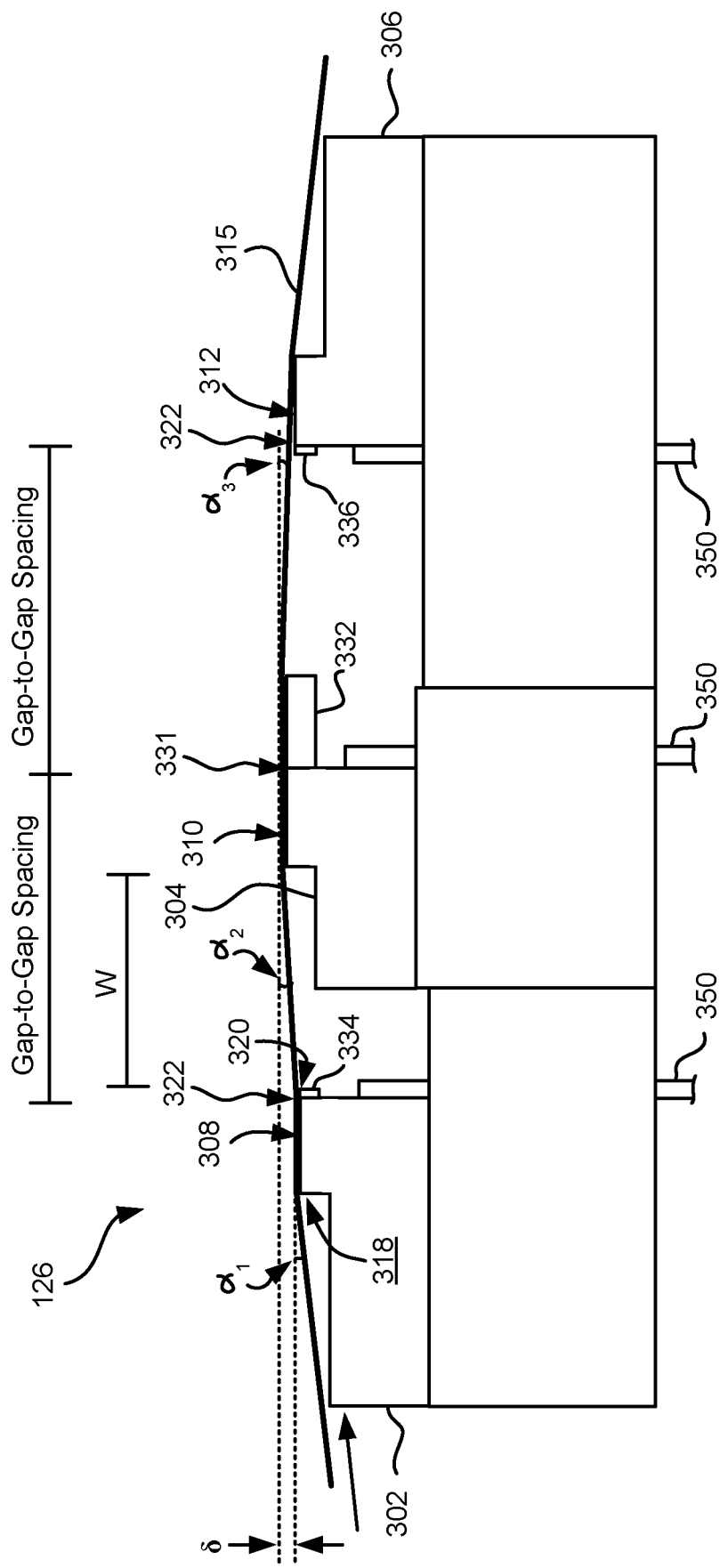
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
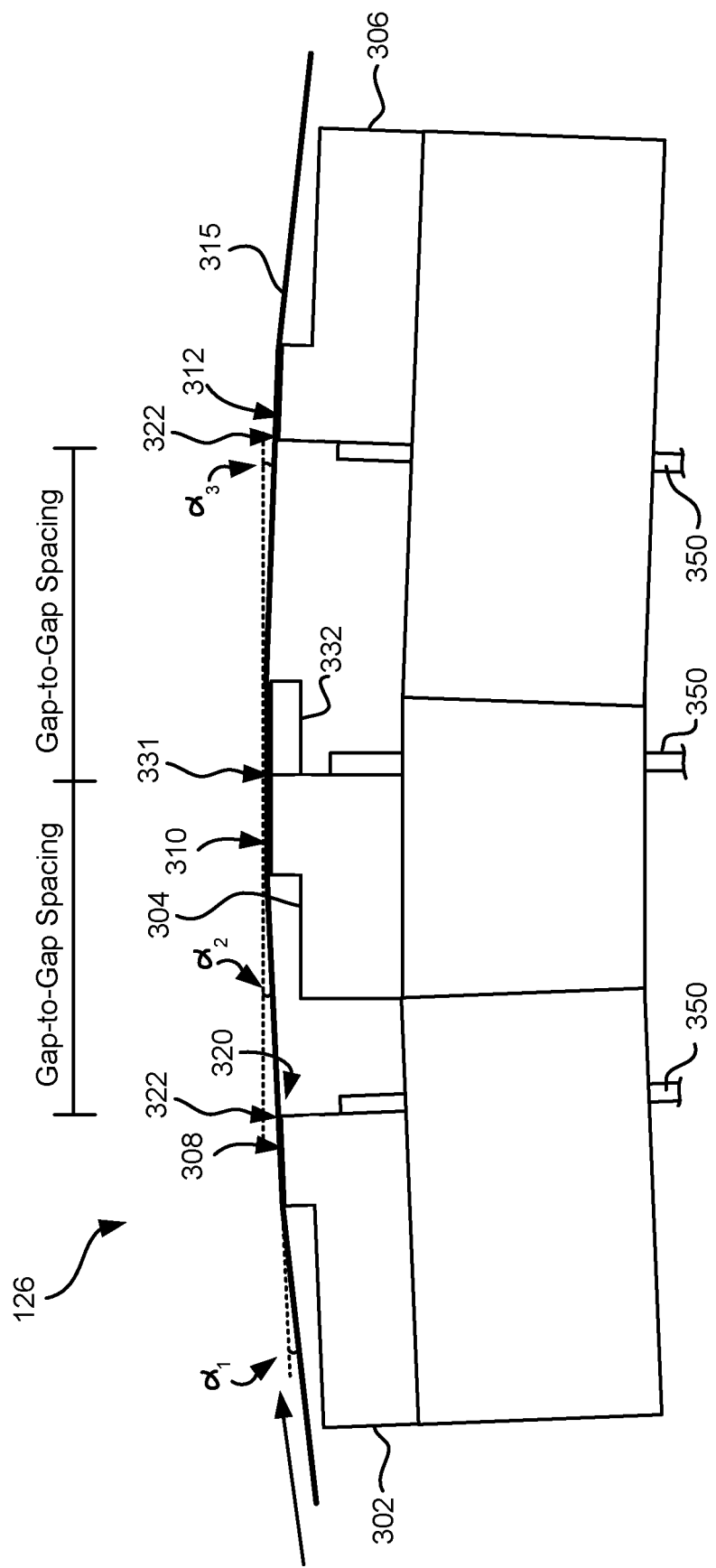
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of write elements 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
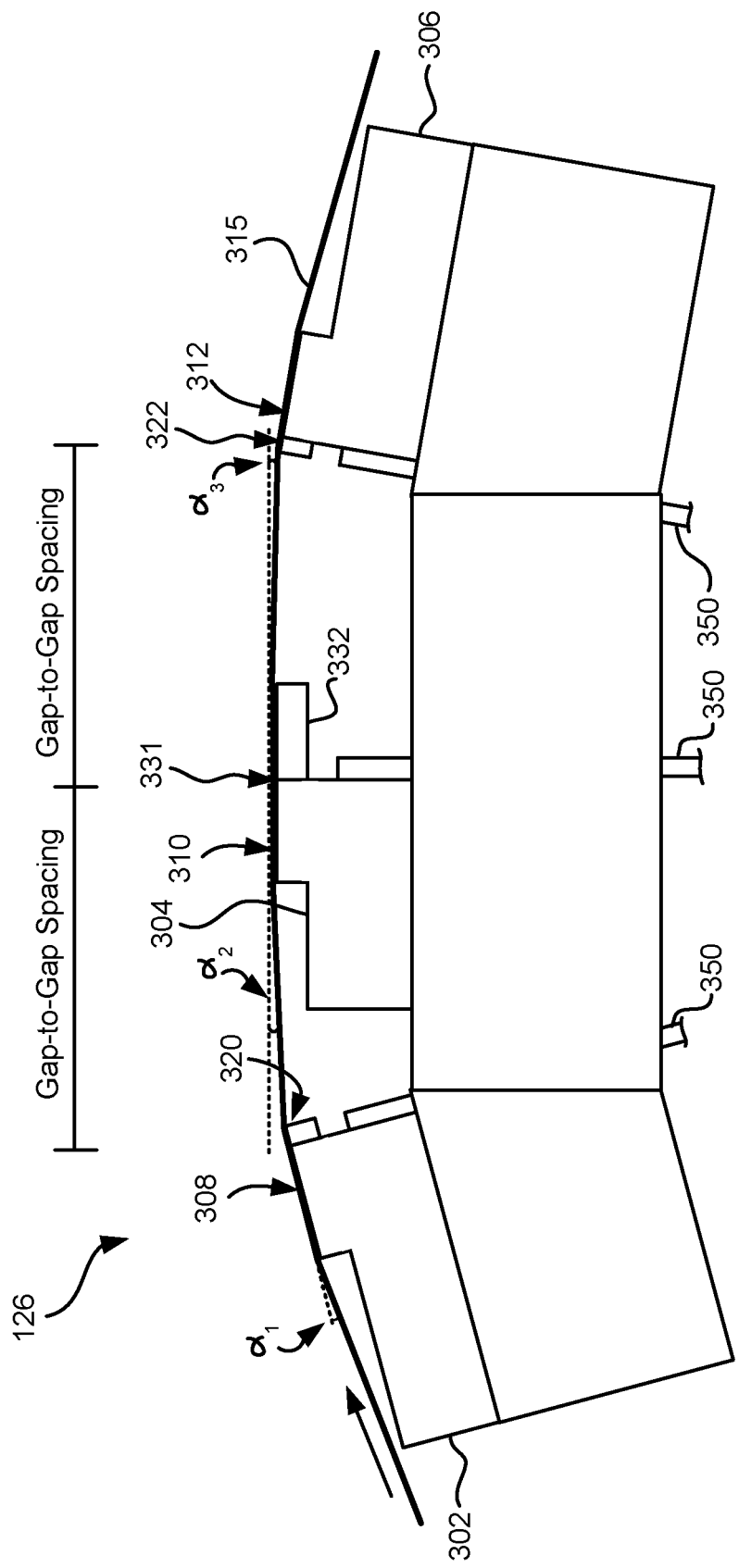
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
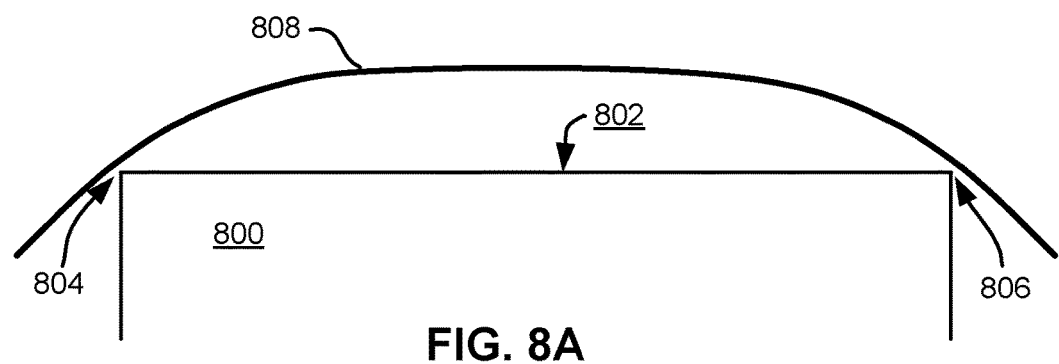
FIGS. 8A-8C are schematics depicting the principles of tape tenting.
Figure 8B:
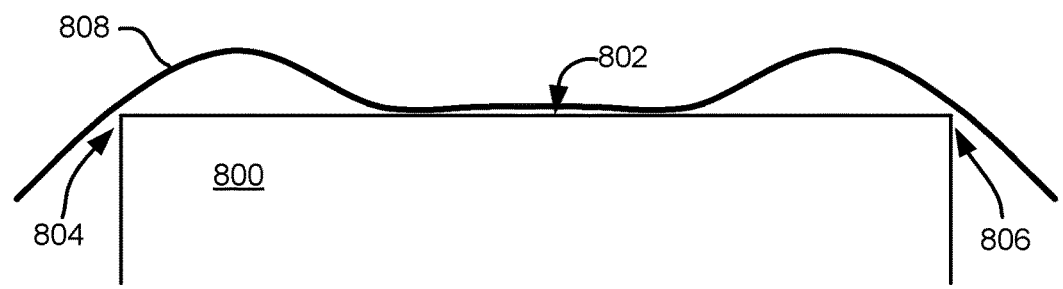
Figure 8C:
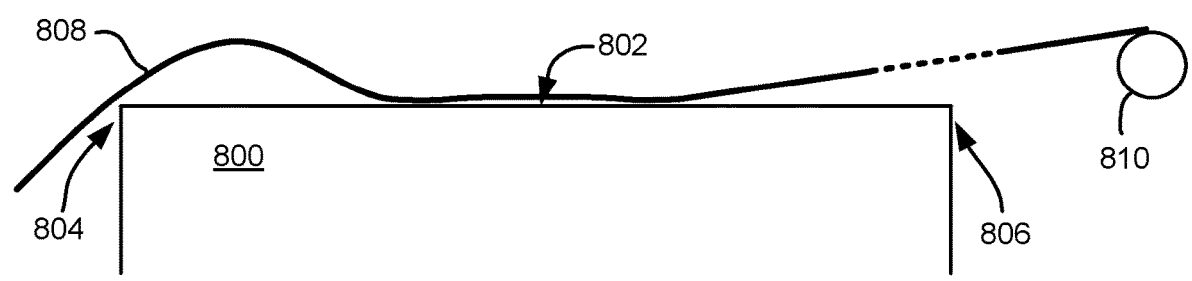

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a sub-ambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the sub-ambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost instance of metadata is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
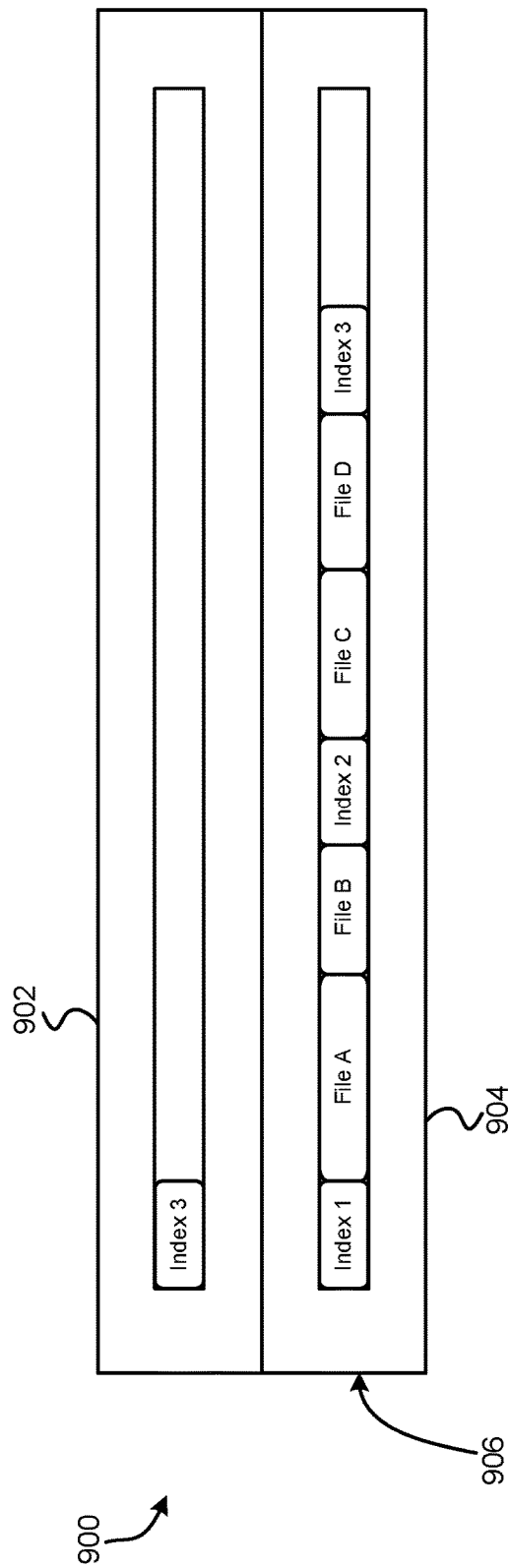
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 differently depending on the desired embodiment. According to some embodiments, the metadata of the index partition 902 may be updated in response to the tape being unmounted, e.g., such that the index may be read from the index partition when that tape is mounted again. The metadata may also be written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be reduced.

Figure 10A:
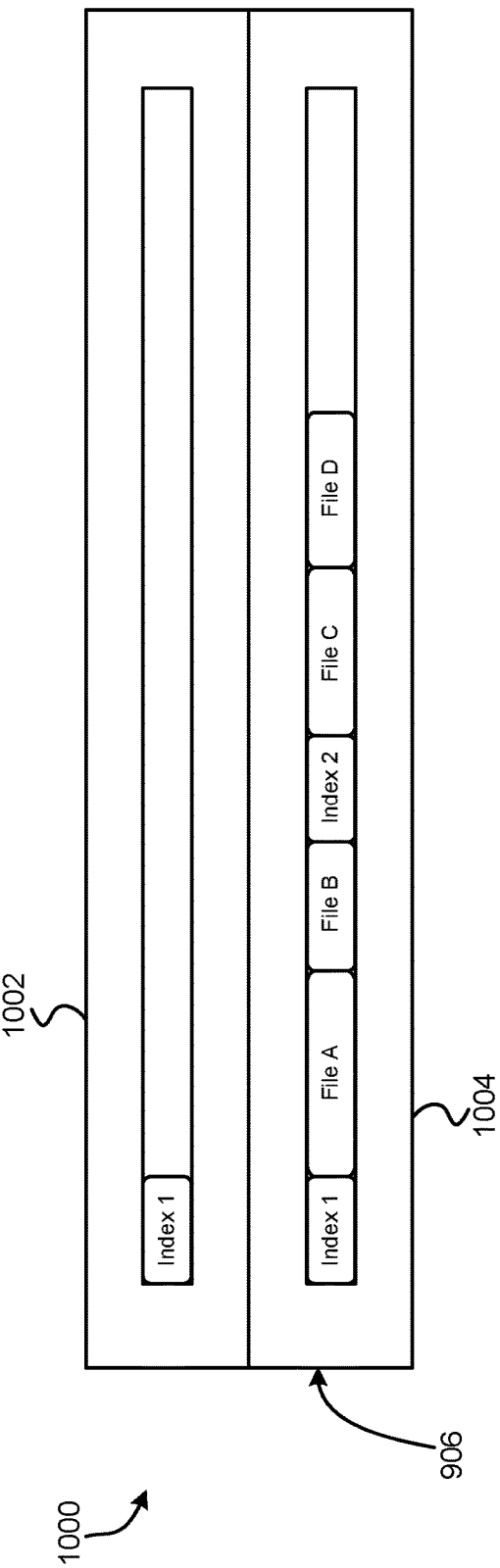
FIG. 10A is a representational diagram of files and indexes stored on a magnetic tape.

For example, looking to FIG. 10A, the effects of experiencing a sudden power outage while data (e.g., files) and metadata (e.g., index information) are being written to the data partition 1004 and index partition 1002 respectively, of a magnetic tape 1000. As shown, if a sudden power outage occurs after files File A, File B, File C, File D and indexes Index 1, Index 2 have been written to the tape 1000, Index 2 includes metadata corresponding to File A and File B, however no metadata corresponding to File C and File D was written before the power outage. As a result, the tape 1000 is in a state in which the final index has not been written in the data partition 1004 or the index partition 1002 (compare to tape 900 of FIG. 9). Additionally, the metadata in the index partition 1002 was not updated before the power outage. Accordingly, Index 1 in the index partition 1002 has not been overwritten with updated metadata corresponding to the current state of the data on the tape 1000.

In a case where a sudden power outage occurred while the LTFS was in the process of a write operation, although the LTFS is able to read data which was successfully written, the relevant data cannot be restored as a file. For instance, referring again to FIG. 10A, although the data that was written at the positions of File C and File D can be read, as it was completely written before the power outage occurred, there is no information on the tape which indicates which of the data actually belongs to File C. In other words, the file which the data belongs to is unknown.

In practice, the data included in File C and File D is either deleted, or kept. If kept, a user is able to read the data even though information regarding the file names and file breaks associated with the data is not known. Moreover, a recovery tool such as LTFS check and recovery utility (ltfsck) may be implemented.

Figure 10B:
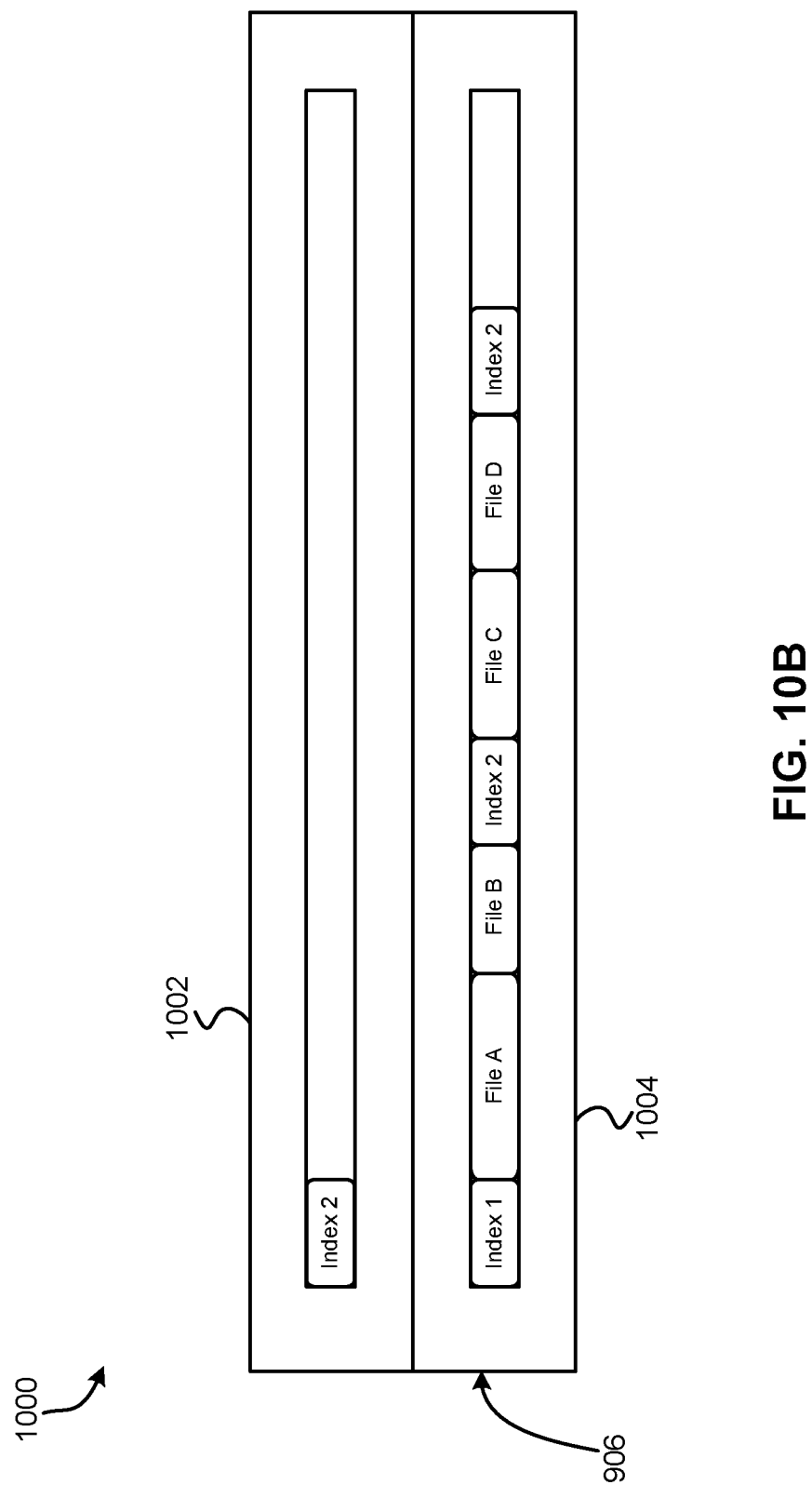
FIG. 10B is a representational diagram of files and indexes stored on a magnetic tape.

Looking to FIG. 10B, when a recovery tool is used, although the data of File C and File D cannot be restored as files because metadata (e.g., such as file names and timestamps of File C and File D) is not present on the tape 1000 (e.g., as an updated index), files created before the index that was last written (Index 2) may be restored using that index Index 2. Specifically, because the tape 1000 of FIG. 10B is not in accordance with the LTFS format, ltfsck may be used to restore the tape 1000 to a tape having a form in accordance with the LTFS format. This may be achieved by writing Index 2 at the beginning of the index partition 1002 and appended to the tail end of the data in the data partition 1004 such that the tape is a form in accordance with the LTFS format as shown.

It should be noted that when a tape that has been restored as shown in FIG. 10B is mounted, it appears that File A and File B are present on the tape because Index 2 holds information for File A and File B. As such, File A and File B may be accessed via the file system. Thus, for LTFS implementations, even if a sudden power outage or the like occurs, files that have been written up to the time of the power outage may be accessed using the last index that was written in the data partition of the tape. Therefore, a common default setting involves rewriting an updated index in the data partition at a certain temporal frequency, e.g., every five minutes, every 1 minute, etc.

However, even as such, although data that was written before a last index update may be recovered, files such as File C and File D of FIGS. 10A-10B cannot be restored because although the data was written to the tape, a corresponding index was not also written. Again, in practice, although the data may be read, because file names and file breaks associated with the data are not known, the relevant data cannot be recovered for practical use.

Alternatively, some conventional implementations write an index after every file. This may be employed in an effort to ensure that data that has been written to tape is not lost, even when there is a sudden power outage during use. For example, an index may be written when each file is closed, rather than at a fixed frequency. However, a significant number of indexes are written to tape in order to ensure that an index is written for each file. Moreover, as the number of files increases, the size of the index to be stored on the tape increases as well, thereby disadvantageously reducing capacity. For example, even after using a compression function to compress an index before being written to tape, an index corresponding to about 1000 files typically consumes about 480 kB of memory on the tape.

This shortcoming is further exacerbated as the size of the files stored on the tape decrease. For example, if files having a size of 1 kB are written on a tape that has a capacity of approximately 1.5 TB, and an index is written after writing each of the respective 1 kB files, the indexes will consume a combined 1497 GB of the total 1.5 TB tape capacity after only 79,000 files have been written to the tape. In other words, 1497 GB of tape memory would be consumed in order to write 79 MB of data.

As previously mentioned, the amount of memory consumed in order to prevent loss of data stored in the memory is undesirable. Moreover, the amount of data lost as a result of not implementing some type of data protection feature is undesirable as well. This is particularly true for data files having smaller sizes stored in linear media such as magnetic tape. Although magnetic tape is a relatively inexpensive storage medium, the foregoing shortcomings are disadvantageous.

In sharp contrast, various embodiments described herein may be able to record data on magnetic tape in a manner such that the relation between records and paths of files is not lost even at the time of a sudden power outage. Moreover, this functionality may further be achieved without consuming a large amount of the capacity of the magnetic medium, as will soon become apparent.

Figure 11:
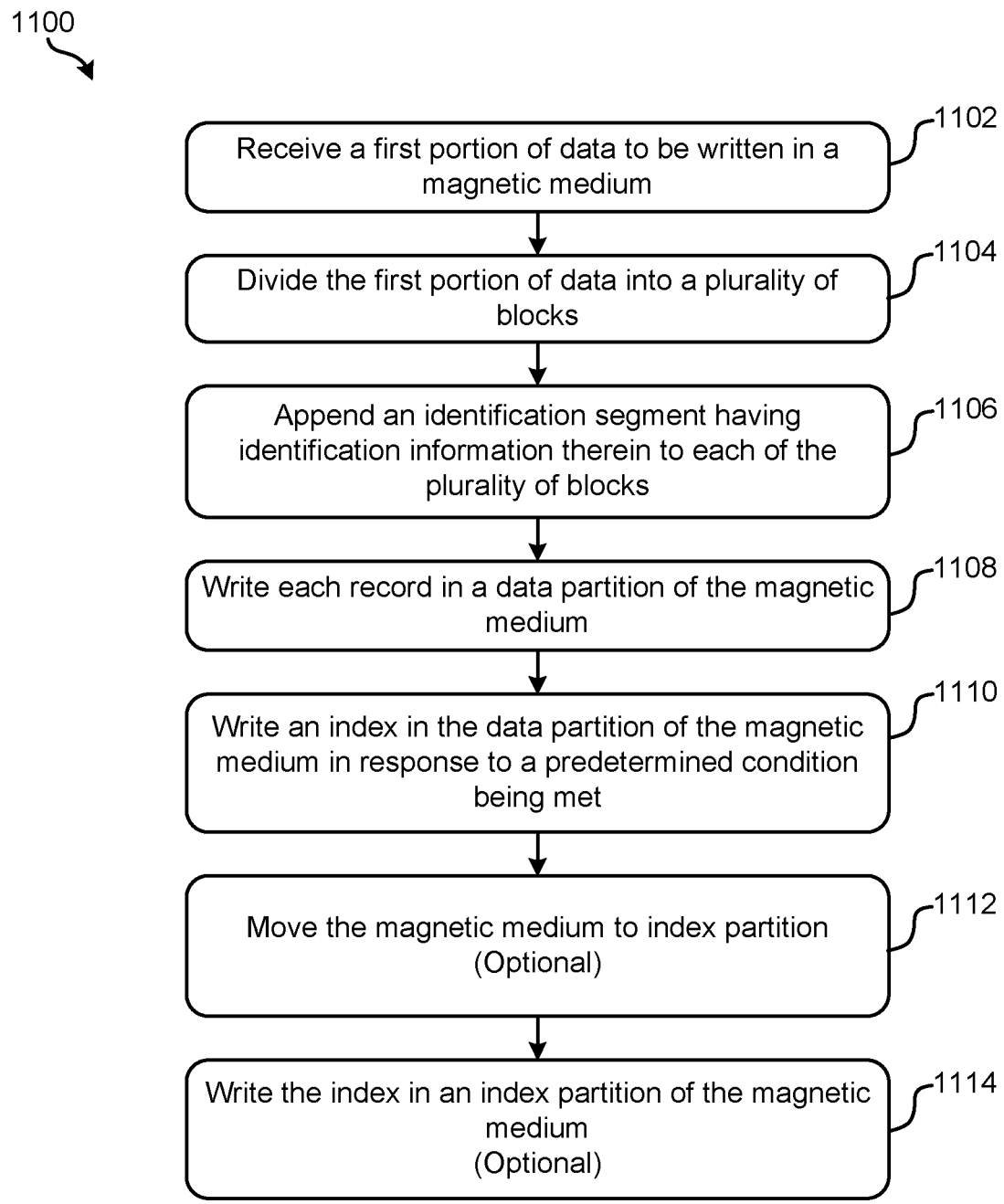
FIG. 11 is a flowchart of a method according to one embodiment.

Looking to FIG. 11, a computer-implemented method 1100 includes an improved process for managing a storage system that stores files of a file system in accordance with one embodiment. The method 1100 may be performed in accordance with the present invention in any of the environments depicted in FIGS. 1-9, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

Again, method 1100 includes a process for managing a storage system that stores files of a file system (e.g., see FIG. 14 below). More specifically, the operations included in method 1100 may preferably include a process of writing data that may be used to reduce data loss and preferably improve efficiency of tape capacity use.

Looking to operation 1102, a first portion of data to be written to a magnetic medium is received. The first portion of data may simply be a file containing data. Moreover, the magnetic medium may include any type of magnetic medium. It should also be appreciated that various embodiments herein can be implemented with a wide range of magnetic media. However, to provide a context, and solely to assist the reader, various embodiments may be described with reference to magnetic tape. This has been done by way of example only, and should not be deemed limiting on the invention defined in the claims.

The first portion of data (e.g., file) may be received from a user, a remote storage system, a data network, etc. according to different approaches. Moreover, the first portion of data may be of any size.

Method 1100 further includes dividing the first portion of data into a plurality of blocks. See operation 1104. According to the present description, a "block" may be considered as a sequence of bytes or bits having a fixed size, also referred to herein as the block size. Thus, each of the plurality of blocks preferably has about the same fixed size (block size). In one approach, the fixed block sizes of each block (excluding a terminal block) are identical. In other approaches, the fixed block sizes may vary slightly from block to block, but in general are preferably within less than 5% of the target fixed block size, and ideally within less than about 2% of the target fixed block size. According to some approaches, the fixed size of the blocks may correspond to a whole number of records. According to an example, which is in no way intended to limit the invention, data may be written according to an LTFS format, with a fixed block size which is recorded at the start of a tape, defined in the LTFS Format Specification.

In one approach, each of the plurality of blocks may have a default block size of 512 kB. In other words, when the first portion of data is of a size greater than 512 kB, the data included in the first portion of data is divided into respective blocks, each of 512 kB. However, the size of the fixed block size may be higher or lower depending on user preference, media type, a size of the first portion of data received in operation 1102, etc., depending on the desired approach. It should also be noted that in some approaches, additional information may also be included with the data to make up the full size (e.g., 512 kB) of each block. For example, information such as ECC information may be added to the data included in each of the blocks, depending on the desired embodiment.

Figure 12:
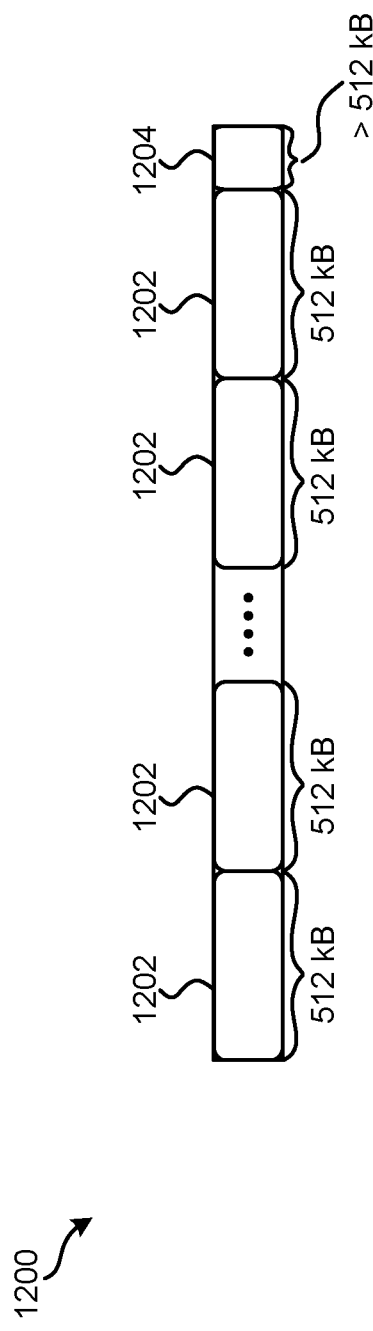
FIG. 12 is a representational diagram of a data file partitioned into a plurality of blocks according to one embodiment.

It should be noted that if there is a data remainder of a size that is less than the fixed block size after dividing the first portion of data into a plurality of blocks, a block of the relevant size may be used when writing the remainder. Looking momentarily to FIG. 12, the file 1200 (e.g., first portion of data) has been separated into a plurality of blocks 1202 having a fixed block size of 512 kB. However, the size of the whole file 1200 is not a perfect multiple of 512 kB, and therefore a remainder of less than 512 kB exists. Accordingly, the final block 1204 has a size of less than the fixed block size of 512 kB.

Referring again to method 1100 of FIG. 11, operation 1106 includes appending (e.g., adding) an identification segment having identification information therein to each of the plurality of blocks. In various approaches, the identification segments may have a fixed size associated therewith. According to an illustrative approach, a default size allocation of the identification segment appended to each of the blocks has a fixed size of 4112 bytes. However, it should be noted that the fixed size of the identification segments may depend on the amount and/or type of identification information included thereon.

In different approaches, the identification information included in each of the identification segments formed in operation 1106 may include any one or more of: a path name of the first portion of data, an offset in the first portion of data corresponding to a location of a respective one of the blocks coupled to the given identification segment, a length of a respective one of the blocks coupled to the given identification segment, a time-stamp, etc.

According to an exemplary approach, which is in no way intended to limit the invention, the identification segment having a fixed size of 4112 bytes may include a path name of the first portion of data (4096 bytes), an offset in the first portion of data corresponding to a location of a respective one of the blocks coupled to the given identification segment (8 bytes) and a length of a respective one of the blocks coupled to the given identification segment (8 bytes), thereby totaling 4112 bytes exactly. However, in other approaches the entire 4112 bytes allocated may not be filled with identification information. For example, the identification segment may only include a path name of the first portion of data (4096 bytes), thereby leaving 16 bytes unused in the identification segment. Unused portions of the identification segment may simply be filled with random data, binary 0's, binary 1's, left unwritten, etc., depending on the desired approach. It follows that the size of the identification segment may be fixed irrespective of the amount of information identification information actually included therein.

The identification information included in each of the identification segments is preferably selected such that it may be used to reconstruct the path name of a file that includes the respective block of data, as well as an offset of the data within the file, a length of the data, etc. Accordingly, the identification information included in each of the identification segments may be used recover the relevant data for practical use even when a power outage occurs before a next index can be written to the tape (e.g., see method 1400 of FIG. 14 below).

Figure 13:
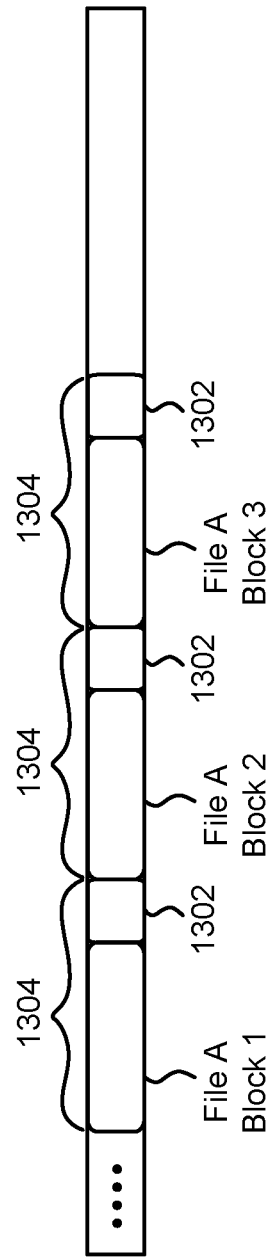
FIG. 13 is a representational diagram of a magnetic tape having records formed thereon according to one embodiment.

In a preferred approach, each block and the corresponding identification information appended thereto forms a record. Looking momentarily to the tape 1300 in FIG. 13, a file File A is shown as having been divided into three blocks Block 1-Block 3, each of the three blocks having a respective identification segment 1302 appended thereto. Moreover, each respective pair of a block and identification segment 1302 appended thereto forms a record 1304. Also, as mentioned above, each of the identification segments 1302 preferably includes identification information therein.

As previously described, a magnetic tape may have at least two partitions formed thereon (e.g., see FIGS. 9-10B). The two partitions may be physical partitions defined during writing of the magnetic tape, physical partitions defined during manufacturing of the magnetic tape, logical partitions designated by a controller, etc., depending on the desired embodiment. Accordingly, returning again to FIG. 11, operation 1108 further includes writing each record in a data partition of the magnetic medium. According to a preferred approach, the magnetic medium is a magnetic tape having a data partition and an index partition formed thereon. Thus, operation 1108 may be performed by appending each record sequentially to each other, beginning at the end of the data previously written to the data partition. Operation 1110 includes writing an index in the data partition of the magnetic medium in response to a predetermined condition being met. According to different approaches, the predetermined condition may be met each time an amount of time has passed, in response to user initiation (e.g., a user enters a command using an Application program interface), each time a file is closed, in response to a certain amount of data being written to the magnetic medium, etc. It follows that operation 1110 may be performed at a different frequency (e.g., using a different period) depending on the type of predetermined condition which triggers the writing of the index in the data partition of the magnetic medium.

The index written to the data partition of the magnetic medium is preferably associated with all data on the magnetic medium. Thus, the index is associated with the portion of data most recently written to the magnetic medium (here the "first portion of data"), in addition to data previously written to the magnetic medium. Thus, the index may include metadata (also referred to herein as "meta-information"), such as file allocation information, corresponding to all of the data included on the magnetic medium, including all data in the previously received first portion of data (file).

Accordingly, the index may be used recover the first portion of data (file) for practical use (e.g., see method 1400 of FIG. 14 below).

Furthermore, optional operation 1112 includes moving the magnetic medium to the index partition. If the index partition is toward the beginning of the magnetic medium, the magnetic medium may be rewound to a beginning of medium in response to determining that a final one of the records has been written to the magnetic medium. Once the magnetic medium has been moved to the index partition, optional operation 1114 includes writing the index in the index partition of the magnetic medium. As previously mentioned, it is desirable that a most recent index is available at the beginning of tape so that the most recent metadata is accessible without having to unwind the tape to an end of the data written thereon. This may be accomplished by overwriting metadata at the beginning of the index partition whenever a new index is created, as would be appreciated by one skilled in the art upon reading the present description.

It follows that the data partition on the magnetic tape is preferably configured to at least store data and indexes associated with the data, while the index partition is configured to store an index, e.g., including meta-information of a file of a file system.

Thus, the processes of method 1100 may be able to reduce the amount of tape consumed to store information other than the actual data. According to an example which is in no way intended to limit the invention, when storing a 1500 GB file on a tape, if file identification information of 4112 bytes is appended to each block of data having a size of 512 kB, the file identification information will consume approximately 12 GB of the tape capacity overall. Thus, identification information only uses about 0.8% of the available memory on the tape, which may be well within an acceptable range, particularly in view of the improved data retention rate the processes of method 1100 provide, e.g., depending on the desired embodiment.

A recovery procedure may be initiated in response to a failure-level event occurring, e.g., such as a sudden (unexpected) loss of power. The recovery procedure may preferably be able to recover a file by updating an index, and writing an updated index to the tape, as will soon become apparent.

Figure 14:
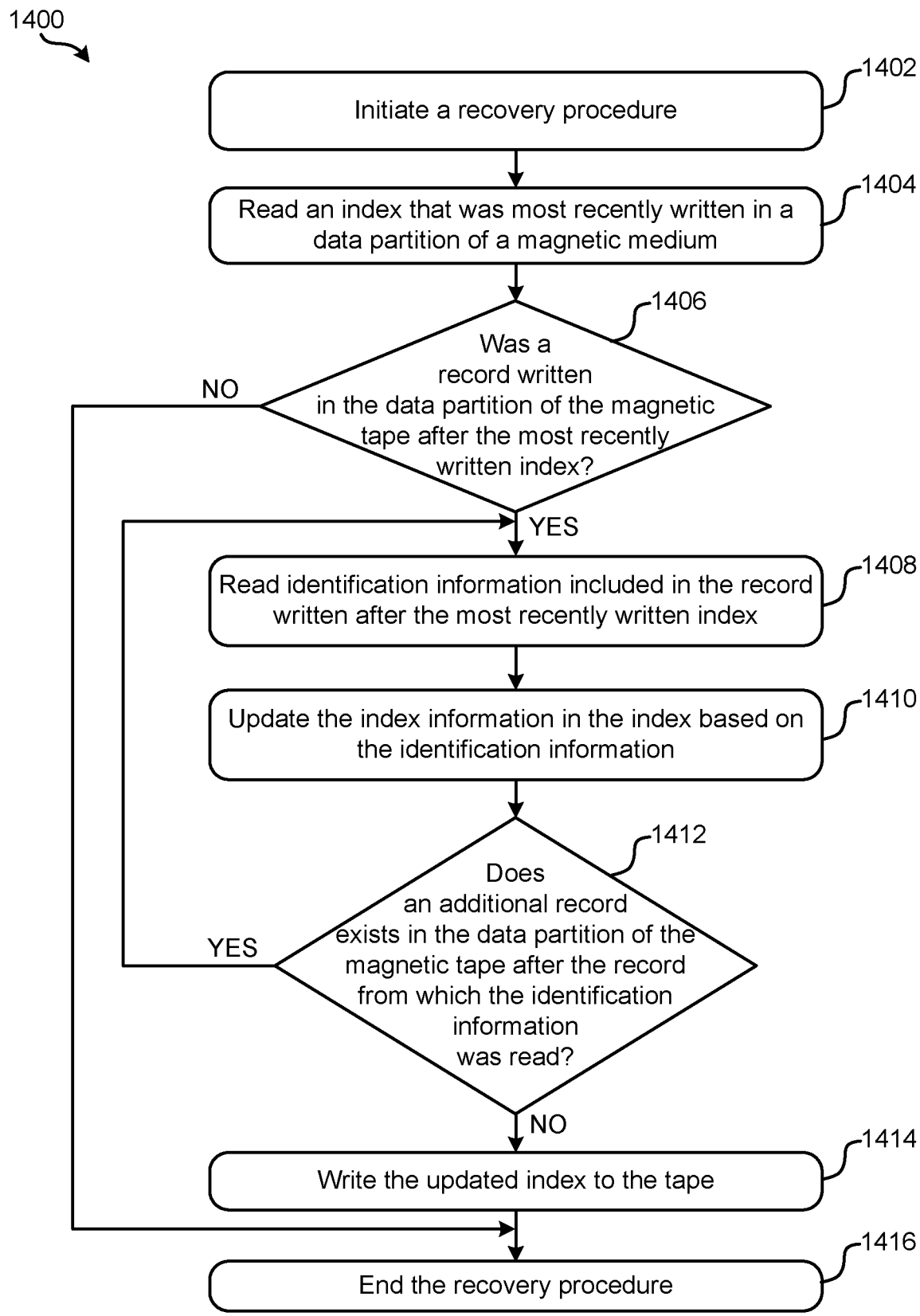
FIG. 14 is a flowchart of a method according to one embodiment.

Now referring to FIG. 14, a flowchart of a computer-implemented method 1400 is shown according to one embodiment. The method 1400 may be performed in accordance with the present invention in any of the environments depicted in FIGS., such as FIG. 11, among others, in various embodiments. Of course, more or less operations than those specifically described in FIG. 14 may be included in method 1400, as would be understood by one of skill in the art upon reading the present descriptions.

Each of the steps of the method 1400 may be performed by any suitable component of the operating environment. For example, in various embodiments, the method 1400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 14, operation 1402 of method 1400 includes initiating a recovery procedure, which may include any of the following operations, as well as other operations. Moreover, operation 1404 includes reading an index that was most recently written in a data partition of a magnetic medium. The most recently written index in the data partition may be identified and/or located by any process which would be apparent to one skilled in the art upon reading the present description. For example, in some approaches an index may have been written together with special information called a "file mark" in the data partition. The file mark may be defined by the Format Specification of LTFS, thereby allowing the most recently written index to be easily located and read. In some instances, the current ltfsck may use a file mark to identify and locate the most recently written index such that it may be read.

Method 1400 also includes determining whether a record was written in the data partition of the magnetic tape after the most recently written index. See decision 1406. According to some approaches, this determination may be made by simply attempting to perform a read operation beyond the end of the most recently written index. It follows that if the read operation fails, it may be determined that no record was written in the data partition of the magnetic tape after the most recently written index. However, if the read operation is successful in returning information, it may be determined that at least one record was written in the data partition of the magnetic tape after the most recently written index A determination that no record was written in the data partition of the magnetic tape after the most recently written index indicates that the failure event (e.g., power outage) did not affect accessibility of data written to the tape. In other words, because an index was the last thing to be successfully written to the data partition before the failure event (e.g., power outage), no records exist in the data partition of tape that are without a corresponding index. Accordingly, method 1400 proceeds to operation 1416 in response to determining that no record was written in the data partition of the magnetic tape after the most recently written index, whereby the recovery procedure is ended.

Alternatively, method 1400 proceeds to operation 1408 in response to determining that a record was written in the data partition of the magnetic tape after the most recently written index. There, operation 1408 includes reading identification information included in the record written after the most recently written index. As described above, a record includes a block of a portion of data (e.g., a file) and identification information corresponding thereto in an identification segment appended to the block, e.g., see FIG. 13 above.

Furthermore, operation 1410 of FIG. 14 includes updating the index information in the index based on the identification information read in operation 1408. Accordingly, operation 1410 is able to update the index information with identification information not yet accounted for despite the occurrence of a failure condition (e.g., a sudden power outage). This provides a significant advantage by affording a tape storage system the ability to recover identification information corresponding to data included in a record once the record has been written to tape.

According to one approach, updating the index information includes adding meta-information (metadata) to the index information included in the most recently written index in the data partition. The meta-information being added to the index information is preferably associated with a portion of data (file) identified by the identification information read in operation 1408. Thus, the index information may be updated such that it corresponds to all records written on the tape, and thus all files included in the data partition.

It should be understood that updating the index information may be performed at a memory location other than on the magnetic tape which contains the data partition. In one example, the index information included in the most recently written index in the data partition may be copied to nonvolatile memory of a tape drive operating on the magnetic tape (e.g., see 156 of FIG. 1A), where updates to the index information may be made in the nonvolatile memory, e.g., in accordance with some or all of the processes included in method 1400.

As shown, decision 1412 includes determining whether an additional record exists in the data partition of the magnetic tape after the record from which the identification information was read in operation 1408. According to some approaches, decision 1412 may be made in a similar manner to decision 1406 above. Thus decision 1412 may include attempting to perform a read operation beyond the end of the previously identified record. Method 1400 returns to operation 1408 in response to determining that an additional record exists in the data partition of the magnetic tape, such that operations 1408, 1410 and decision 1412 are performed again.

Alternatively, method 1400 proceeds to operation 1414 in response to determining that no more additional records exist in the data partition of the magnetic tape after the record from which the identification information was last read in operation 1408. Operation 1414 includes writing the updated index to the tape at some point, such as immediately upon determining that no more additional records exist in the data partition, upon a user request, upon a predetermined condition being met, upon performing a subsequent write operation (e.g., see FIG. 11 above), etc. Such index may be written after the last record, in the index partition, etc.

Furthermore, method 1400 proceeds to operation 1416, whereby the recovery procedure is ended. Again, the recovery procedure may have been initiated as a result of a failure event (e.g., power outage) and therefore may be reinitiated upon a subsequent failure event occurring. It follows that a flow of operations as shown in the embodiment of FIG. 14 may be implemented to achieve recovery of a file by updating the index and writing onto the tape as would be appreciated by one skilled in the art upon reading the present description.

FIG. 15 depicts a program code in LTFS format corresponding to a method 1500, in accordance with one exemplary embodiment, which is in no way intended to limit the invention. As an option, the present exemplary embodiment may be implemented in conjunction with features from any other embodiment listed herein, such as those described with reference to the other FIGS. However, such method 1500 and others presented herein may be used in various applications and/or in permutations which may or may not be specifically described in the illustrative embodiments listed herein. Further, the method 1500 presented herein may be used in any desired environment.

Looking to FIG. 15, after initiating a record as seen in operation 1502, the program code included in method 1500 of an LTFS index specifically includes recording (e.g., storing) a starting position of data in the record, and a length of the data are written in the index. See operations 1504 and 1506 respectively. Accordingly, as long as the LTFS conforms to the LTFS Format Specification, a record may still be read after an unplanned loss of power even in the event that corresponding identification information has not yet been added to an index on tape.

As explained above, in the event that an index that was last written at a time that a sudden power outage occurred is read and it is further determined that there is a record at the rear thereof along the length of tape, the record is read and file identification information appended to the rear of a block in the record, and which represents the data in the block, is used according to any of the approaches described and/or suggested herein. By this approach, even in a case where a sudden power outage occurred, the index in the memory can be updated utilizing data up to the data that was last written. Moreover, non-indexed data on tape may also be tied to a file corresponding thereto by implementing records according to some of the embodiments described herein.

It should also be noted that the file identification information described herein may not be referred to from within the index(s) on tape. Accordingly, some of the embodiments described above may be applied without making substantial changes to the LTFS Format Specification.

As previously mentioned, the size of the block may vary depending on the desired approach. Although an illustrative block size may be 512 kB in some approaches, the block size may be higher or lower in other approaches. However, as the size of the block decreases, the ratio between the size of the block and the size of the identification segment decreases as well. As the amount of data stored in each of the records decreases, a greater number of records may be able to fit on the same amount of tape, but less data is stored in each of those records, while the amount of identification information may remain constant. According to an example, which is in no way intended to limit the invention, the block size may be 1 kB, e.g., to accommodate file sizes of about 1 kB. However, an identification segment of 4112 bytes is appended to an end of each of the 1 kB blocks, thereby making the size of the total record only 5112 bytes. Consequently, approximately ⅘ of each record, and thereby only ⅘ of the tape as a whole, will be occupied by file identification information, while only ⅕ of the tape will include data itself. Thus, data storage efficiency may vary depending on the block size.

However, the improvements to data retention and storage efficiency achieved by the various embodiments described herein are still able to overcome the shortcomings experienced by conventional implementations.

As previously mentioned, data that was written before a last index update in conventional implementations cannot be restored because, although the data was written to the tape, a corresponding index was not also written. Thus, implementing records (e.g., according to FIG. 11) overcomes the low data retention rates of conventional implementations, even when dealing with smaller block sizes.

Alternatively, some conventional implementations write an index after every file. Although this reduces data loss, a significant amount of capacity on the tape is consumed storing the indexes. In sharp contrast, some of the approaches described herein are able to significantly improve magnetic medium storage efficiency, even when dealing with instances which include small block sizes.

According to an in-use example, which is in no way intended to limit the invention, if as many 1 kB files as possible were written to a tape having a maximum capacity of approximately 1.5 TB, Table 1 below illustrates that although only 79,000 files can be stored on the tape using conventional implementations, 267 million files can be stored on the tape when employing the embodiments described herein as seen in Table 2. It should be noted that "conventional implementations" as used in the present example is intended to refer to a situation where an index is written after every file on the tape as described above.

Conventional Implementations

TABLE 1

| Number of files written to the tape | Approximately 79000 (corresponds to 79 MB) |
|---|---|
| Total size of indexes on the tape | Approximately 1497 GB |

Improvement

TABLE 2

| Number of files written to the tape | Approximately 267000000 (corresponds to 1371 GB) |
|---|---|
| Total size of indexes on the tape | Approximately 128 GB |
| Total size of file identification information on the tape | Approximately 1098 GB |

Thus, it is apparent that various embodiments of the present invention are provide a significant improvement in comparison to conventional implementations. In other words, by implementing some of the embodiments included herein, it is possible to solve the conventional problem that if an index is written immediately after writing a file, the number of indexes on the tape becomes too large and consequently a large number of files cannot be stored on a single tape due to the lost capacity.

However, it should be noted that the ability to select the manner in which data is written to a tape preferably remains available to a user, administrator, operating software, etc., depending on various conditions. For instance, although implementing some of the embodiments described herein may provide improvements over conventional implementations even for small block sizes, the ability to selectively implement a different storage scheme may be provided in some embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

Figure 16:
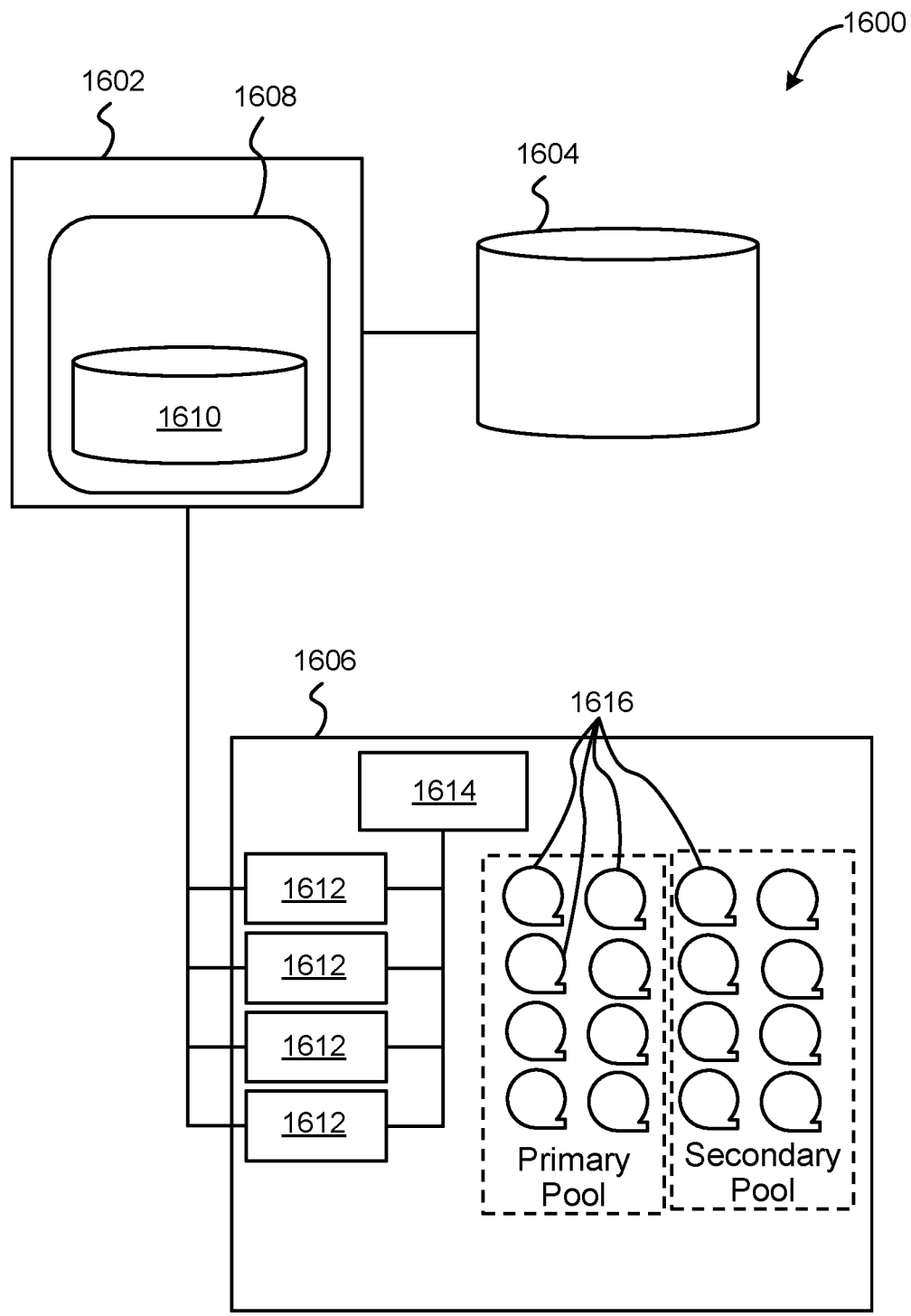
FIG. 16 is a block diagram of a tape storage system according to one embodiment.

Looking to FIG. 16, a tape storage system 1600 is illustrated in accordance with one embodiment. As an option, the present system 1600 may be implemented in conjunction with features from any other embodiment listed herein, such as those described with reference to the other FIGS. However, such system 1600 and others presented herein may be used in various applications and/or in permutations which may or may not be specifically described in the illustrative embodiments listed herein. Further, the system 1600 presented herein may be used in any desired environment. Thus FIG. 16 (and the other FIGS.) may be deemed to include any possible permutation.

As shown, tape storage system 1600 includes a host location 1602 which is coupled to a disk based storage location 1604 and a tape library 1606. The host location 1602 in the present embodiment includes a tape application 1608 having a tracking database 1610. In some approaches, tape application 1608 may be used to control tape library 1606, e.g., transfer and/or access data stored in the tape library 1606. For example, the tape application 1608 may record the location of data on tape cartridges into the tracking database 1610. Moreover, in some approaches, the tracking database 1610 may be used to implement any one or more of the processes included above in method 1100 and/or 1400.

Moreover, tape library 1606 includes tape drives 1612 which are coupled to medium changer 1614. Each of the tape drives 1612 preferably include a tape head which is able to write data to and/or read data from the tape stored in a tape cartridge 1616 when positioned in one of the tape drives 1612. Medium changer 1614 may be used to coordinate which tape cartridge 1616 is in each of the tape drives 1612, e.g., according to instructions received from the host location 1602. Furthermore, tape cartridges 1616 are stored collectively in pools. According to the present embodiment, system 1600 is shown as having a primary pool and a secondary pool which may be used to separate the tape cartridges 1616 according to any desired storage configuration. Moreover, the tape application 1608 may be used to manage the primary and secondary pools.

According to some approaches, the tape library 1606 may be used to store data received from the disk based storage location 1604. In other words, the tape library 1606 may be used to archive data formerly stored at the disk based storage location 1604. According to one example, which is in no way intended to limit the invention, as data stored on the disk based storage location 1604 becomes "colder" (e.g., has an update rate slower than "hot" data), the host location 1602 may decide to transfer such data to the tape library 1606 for archival storage, e.g., to make room at the disk based storage location 1604 for "hotter" data.

What is claimed is:

1. A computer-implemented method, comprising:
   receiving a first portion of data to be written in a magnetic medium;
   dividing the first portion of data into a plurality of blocks;

appending an identification segment having identification information therein to each of the blocks, wherein each block and the corresponding identification information appended thereto forms a record;
writing each record in a data partition of the magnetic medium;
writing an index in the data partition of the magnetic medium in response to a predetermined condition being met, wherein the index is associated with all data on the magnetic medium;
rewinding the magnetic medium to a beginning of medium in response to a final one of the records being written in the magnetic medium; and
writing the index in an index partition of the magnetic medium,
wherein the magnetic medium is a magnetic tape,
wherein the index is written in the index partition of the magnetic medium in response to rewinding the magnetic medium to the beginning of medium.

2. The computer-implemented method as recited in claim 1, wherein the identification information is selected from the group consisting of: a path name of the first portion of data, an offset in the first portion of data corresponding to a location of a respective one of the blocks, and a length of a respective one of the blocks.

3. The computer-implemented method as recited in claim 1, wherein each of the blocks has a fixed size.

4. The computer-implemented method as recited in claim 1, wherein the identification segment appended to each of the blocks has a fixed size.

5. The computer-implemented method as recited in claim 1, comprising:
reading an index that was most recently written in the data partition of the magnetic medium;
determining whether a record was written in the data partition after the most recently written index;
reading identification information included in the record in response to determining that the record was written in the data partition after the most recently written index;
updating index information in the index based on the identification information read; and
writing the updated index to the magnetic medium.

6. The computer-implemented method as recited in claim 5, wherein updating the index information in the index includes adding meta-information to the index information, the meta-information being associated with a portion of data identified by the identification information read.

7. A computer-implemented method, comprising:
reading an index that was most recently written in a data partition of a magnetic medium;
determining whether a record was written in the data partition after the most recently written index;
reading identification information included in a record in response to determining that the record was written in the data partition after the most recently written index;
rewinding the magnetic medium to a beginning of medium;
updating index information in the index based on the identification information read; and
writing the updated index in an index partition of the magnetic medium,
wherein the magnetic medium is a magnetic tape,
wherein the updated index is written in the index partition of the magnetic medium in response to rewinding the magnetic medium to the beginning of medium.

8. The computer-implemented method as recited in claim 7, wherein updating the index information includes adding meta-information to the index information, the meta-information being associated with a portion of data identified by the identification information read.

9. The computer-implemented method as recited in claim 7, wherein the record includes a block of a portion of data and the identification information in an identification segment appended to the block.

10. The computer-implemented method as recited in claim 9, wherein the block has a fixed size.

11. The computer-implemented method as recited in claim 9, wherein the identification segment has a fixed size.

12. The computer-implemented method as recited in claim 7, wherein the identification information is selected from the group consisting of: a path name of a portion of data associated with the record, an offset in the portion of data corresponding to a location of a block included in the record, and a length of the block included in the record.

13. A computer program product comprising a computer readable storage medium having program instructions embodied therewith, the program instructions executable by a processor to cause the processor to:
read, by the processor, an index that was most recently written in a data partition of a magnetic tape;
determine, by the processor, whether a record was written in the data partition after the most recently written index;
read, by the processor, identification information included in a record in response to determining that the record was written in the data partition after the most recently written index;
rewind, by the processor, the magnetic tape to a beginning of tape;
update, by the processor, index information in the index based on the identification information read; and
write, by the processor, the updated index in an index partition of the magnetic tape,
wherein the updated index is written in the index partition of the magnetic tape in response to rewinding the magnetic tape to the beginning of tape.

14. The computer program product as recited in claim 13, wherein updating the index information includes adding meta-information to the index information, the meta-information being associated with a portion of data identified by the identification information read.

15. The computer program product as recited in claim 13, wherein the record includes a block of a portion of data and the identification information in an identification segment appended to the block.

16. The computer program product as recited in claim 15, wherein the block has a fixed size, wherein the identification segment has a fixed size.

17. The computer program product as recited in claim 13, wherein the identification information is selected from the group consisting of: an offset in a portion of data corresponding to a location of a block included in the record, and a length of the block included in the record.

* * * * *